Patented Feb. 3, 1931

1,791,179

UNITED STATES PATENT OFFICE

GERALD L. WENDT, OF STATE COLLEGE, PENNSYLVANIA, ASSIGNOR TO STANDARD OIL COMPANY, OF WHITING, INDIANA, A CORPORATION OF INDIANA

PREPARATION OF MERCAPTANS

No Drawing. Original application filed July 16, 1924, Serial No. 726,379. Divided and this application filed November 12, 1925. Serial No. 68,729.

The present invention relates to preparation of lower mercaptans and particularly to the preparation of solutions of lower mercaptans suitable for use in the removal of sulfur and sulfur compounds from hydrocarbon oil, especially the lighter oils, such as gasoline, naphtha, burning oils and the like, as described in my application Serial No. 726,379, filed July 16, 1924, which has eventuated into Patent Number 1,668,225 issued May 1, 1928, from which the present application has been divided.

The preferred lower mercaptan compounds, by which term I designate the mercaptans (or soluble mercaptides thereof) have less than 10 carbon atoms and boil below 350° F.

According to the present invention I treat petroleum naphtha containing mercaptan compounds with caustic solution in known manner and prepare the mercaptans or mercaptides from the spent caustic solution. Thus I may take a solution containing 15 to 20% sodium hydroxide and use it for washing naphtha until it is reduced to from 2 to 10% sodium hydroxide strength. This spent solution generally contains appreciable amounts of lower sodium mercaptides. The sodium sulfide also contained therein is decomposed and precipitated as calcium sulfide which is removed from the solution of mercaptides by decantation or filtration. This decomposition may suitably be effected with lime or calcium hydrosulfide. In actual practice spent lime or lime solutions through which refinery gases have been passed, may be used such spent lime being largely composed of calcium hydrosulfide.

As a specific example, two parts of spent caustic and three parts of spent lime solutions are mixed together, the precipitate separated, yielding a red supernatant liquor mainly constituted by a solution of sodium mercaptides. These proportions may be varied according to the proportion of spent lime required to precipitate the sulfides in the spent caustic solution.

I claim:

1. The method of preparing a solution of lower mercaptan compounds which comprises washing petroleum naphtha with a caustic soda solution and adding to the resulting solution a calcium compound which reacts with the sodium sulfide present to precipitate the sulfide radical.

2. The method of preparing a solution of lower mercaptan compounds which comprises washing petroleum naphtha with a caustic soda solution, and adding thereto a solution of calcium hydrogen sulfide derived from the washing of hydrocarbon gases with a lime suspension.

3. The method of preparing a solution of lower mercaptan compounds which comprises washing petroleum naphtha with a caustic soda solution, adding to the resulting solution a calcium compound which reacts with the sodium sulfide present to precipitate the sulfide radical, and separating the precipitate from the solution.

4. The method of preparing a solution of lower mercaptan compounds which comprises washing petroleum naphtha with a caustic soda solution, adding thereto calcium hydrogen sulfide derived from the treatment of hydrocarbon gases with lime, and removing precipitated calcium sulfide from the solution.

GERALD L. WENDT.